(12) United States Patent
Kurtz et al.

(10) Patent No.: US 8,266,844 B2
(45) Date of Patent: Sep. 18, 2012

(54) PAVED SURFACE RESTRAINT AND METHOD OF INSTALLATION

(75) Inventors: Rubin Kurtz, Toronto (CA); David Frieberg, Richmond Hill (CA)

(73) Assignee: Surefoot Hardscape Products, Inc., Toronto, Ontario (CA)

( * ) Notice: Subject to any disclaimer, the term of this patent is extended or adjusted under 35 U.S.C. 154(b) by 682 days.

(21) Appl. No.: 12/218,743

(22) Filed: Jul. 17, 2008

(65) Prior Publication Data

US 2009/0038238 A1    Feb. 12, 2009

(51) Int. Cl.
*E02D 27/00*    (2006.01)

(52) U.S. Cl. .............................................. 52/102; 404/7

(58) Field of Classification Search ............... 52/102, 52/585; 404/7, 8
See application file for complete search history.

(56) References Cited

U.S. PATENT DOCUMENTS

| | | |
|---|---|---|
| 397,732 A | 2/1889 | Landis |
| 670,001 A | 3/1901 | Morse |
| 992,529 A | 5/1911 | Abraham |
| 1,349,340 A | 8/1920 | Hotchkiss |
| 1,727,516 A | 9/1929 | Miller |
| 1,764,029 A | 6/1930 | Miller |
| 1,798,265 A | 3/1931 | McGibbon |
| 1,916,494 A | 7/1933 | Schrickel |
| 1,939,007 A | 12/1933 | Heltzel |
| 1,977,021 A | 10/1934 | Spencer |
| 1,979,979 A | 11/1934 | Martini |
| 2,094,519 A | 9/1937 | Ballard |
| 2,662,342 A | 12/1953 | Peterson |
| 2,678,482 A | 5/1954 | Cuthbertson et al. |
| 2,842,344 A | 7/1958 | Todd |
| 2,877,600 A | 3/1959 | Slate |
| 2,940,152 A | 6/1960 | Riehl |
| 3,034,613 A | 5/1962 | Heltzel |
| 3,144,700 A | 8/1964 | Heltzel |

(Continued)

FOREIGN PATENT DOCUMENTS

CA    1140346    2/1963

(Continued)

OTHER PUBLICATIONS

Borderpath Advertisement—Borderscapes Wholesale Landscape and Edging Supply—2 pgs.—1998.

(Continued)

*Primary Examiner* — Basil Katcheves
(74) *Attorney, Agent, or Firm* — R. Neil Sudol; Coleman Sudol Sapone, P.C.

(57) ABSTRACT

A paver or landscape edging is provided with enhanced anchoring means. The edging has an elongated, longitudinal strip with a paver-facing surface and an opposed surface, and extensions extending from the opposed surface of the elongated strip, each comprising a first wall edge and a bore for receiving a fastener such as a spike or stake. A strap member extends between neighboring extensions, offset from the first wall edge and defining a gap, or anchoring region, when the edging is placed on a substrate. The installed edging may be anchored by fasteners, and by root systems of a concealing layer placed over the edging that grow around the strap member. In addition, a method for installing pavers provides for the fixing of a portion of the edging on the substrate prior to cutting a strap to allow the edging to be deformed in conformance with a curved or irregular boundary.

15 Claims, 5 Drawing Sheets

U.S. PATENT DOCUMENTS

| | | | |
|---|---|---|---|
| 3,305,998 A | 2/1967 | Deisenroth | |
| 3,315,752 A | 4/1967 | Pasquini | |
| 3,385,552 A | 5/1968 | Drasek et al. | |
| 3,387,786 A | 6/1968 | Rynberk | |
| 3,472,133 A | 10/1969 | Ziehm, Jr. | |
| 3,487,600 A | 1/1970 | Greene | |
| 3,676,952 A | 7/1972 | Watts | |
| 3,762,113 A | 10/1973 | O'Mullan et al. | |
| 3,777,421 A | 12/1973 | Bomba et al. | |
| 4,073,177 A | 2/1978 | Leroux | |
| 4,219,941 A | 9/1980 | Hair | |
| 4,349,596 A | 9/1982 | Hendrix | |
| 4,372,079 A | 2/1983 | Trageser | |
| 4,601,140 A | 7/1986 | Russo | |
| 4,628,632 A | 12/1986 | Zwier | |
| 4,647,491 A | 3/1987 | Ireland et al. | |
| 4,824,068 A | 4/1989 | Ferland | |
| 4,831,776 A | 5/1989 | Fritch | |
| 4,863,307 A | 9/1989 | Jones | |
| 4,940,624 A | 7/1990 | Horiki et al. | |
| 4,969,289 A | 11/1990 | Trifiletti | |
| 4,971,475 A | 11/1990 | Castonguay | |
| 5,073,061 A | 12/1991 | Jones | |
| D329,709 S * | 9/1992 | Strobl, Jr. | D25/164 |
| 5,212,917 A | 5/1993 | Kurtz et al. | |
| 5,240,343 A | 8/1993 | Strobl, Jr. | |
| 5,375,941 A | 12/1994 | Strobl, Jr. | |
| 6,185,893 B1 | 2/2001 | Gaston | |

FOREIGN PATENT DOCUMENTS

| | | |
|---|---|---|
| CA | 1267554 | 9/1988 |
| CA | 2070181 | 6/1993 |
| CA | 2080824 | 10/2001 |
| CH | 168653 | 4/1934 |
| DE | 2945292 | 5/1981 |
| EP | 0367259 | 9/1990 |
| FR | 1240071 | 7/1960 |
| GB | 417724 | 10/1934 |

OTHER PUBLICATIONS

Borderpro Advertisement—Borderscapes Wholesale Landscape and Edging Supply—2 pgs.—1998.
Bric-Edge Advertisement—Oly-Ola Sales, Inc.—4 pgs.
Brickhold Brick Paver Edging Advertisement—Borderscapes Wholesale Landscape and Edging Supply—2 pgs.—1998.
Brickstop Advertisement—1pg.
Clic-Edge Information Sheet—1 pg.
Diamond-Lok Advertisement—Valley View Specialties Co.—4 pgs.
Drain-EDG Advertisement—Oly-Ola Sales, Onc.—2 pgs.
Price List—Schulter Systems—56 pgs. Mar. 1, 2001.
KAMB-Raseneinfassungen Product Display Sheet—1 pg.
The Proven Leader in Landscape Edgings Advertisement—Valley View Industries—4 pgs.
Page Edge Instruction Sheet—2 Pgs.
Pave Edge Paver Restraint System—Advertisement—4 pgs.—1998.
Permaloc Permastrip "L-Shaped" Aluminum Maintenance Strip Advertisement—8 pgs.
ProLine Aluminum Landscape Edging Advertisement—2 pgs.
Snap Edge Advertisement—5 pgs.
Snap Edge Jr. Advertisement—2pgs.
Stable Edge Advertisement—2 pgs.
Tru-Edge Advertisement—2 pgs.

* cited by examiner

PAVED SURFACE RESTRAINT AND METHOD OF INSTALLATION

TECHNICAL BACKGROUND

1. Technical Field

This invention relates to paver and brick edgings, and the laying of brick and paving stones and the like.

2. Description of the Related Art

It is often desirable to cover a substrate, such as a terrestrial substrate like soil, sand, or gravel, with paving stones, bricks, and the like. The paving stones, bricks, or similar building materials thus provide a paved region. The paved surface may abut another region, such as a grassy lawn, a garden, or other soil, sand, or gravel-based region. When such a paving surface is installed, an edging or restraint may be simultaneously installed to maintain the paving stones within the region defined by the restraint. The edging reduces the likelihood that paving stones or bricks will shift horizontally as a result of traffic, or as a result of shifting of the underlying terrestrial substrate. These edgings may, once installed adjacent the paved region, protrude from the ground or may be completely concealed by grass, soil, sand, gravel, or other materials.

Installation of such restraints or edgings typically requires that the edging be shaped to fit the boundary of the region to be paved, before it can be laid on the terrestrial substrate and fixed in place. Prior art edgings thus include rigid edgings, which are generally provided with a reinforced structure to support a substantially straight boundary defined by pavers, and flexible edgings, which may be bent to conform with a curved boundary. Installation is thus complicated by the curves or irregular shapes of a boundary, as two different types of edgings are frequently needed to edge an entire boundary. Further, even if an edging can be bent or even cut to conform with an irregular boundary, the edging piece or pieces must be first cut and/or bent to fit a segment of the boundary, then laid in place along the boundary and checked; if the edging does not conform to the desired boundary, it must be removed, reshaped or cut further, and replaced, perhaps several times, until it conforms to the desired boundary and can be fixed in place.

It would accordingly be advantageous to provide an edging that facilitates installation by allowing the edging to be shaped and reshaped without requiring removal from its place along the boundary.

BRIEF DESCRIPTION OF THE DRAWINGS

In drawings which illustrate by way of example only a preferred embodiment of the invention.

FIG. 4b is a bottom view of a second end of the edging of FIG. 4a.

DETAILED DESCRIPTION

It will be appreciated by those skilled in the art that the embodiments of the apparatus referred to herein may be referred to as "restraints", "edgings", or "paver edgings", without limitation of the described embodiments and the claimed invention herein. Further, it will be appreciated by those skilled in the art that while embodiments of the apparatus may be described herein with reference to installation and use for restraining or edging a paved surface paved with bricks or paving stones abutting or adjoining a region that is not paved, the embodiments herein include all possible paving means, such as bricks, paving stones, simulated rock facades, tile, wood planks, and other pavers of natural or artificial material, whether interlocking or otherwise regularly or randomly arranged. All such paving means are referred to herein as "paver", and this terminology is not intended to be restrictive. The non-paved region described herein is a region that is not paved with paving means. It will be appreciated that this non-paved region may comprise a surface including soil, gravel, grass, sand, or other garden regions or landscaping materials. While the paved region and non-paved region may be disposed on a terrestrial substrate such as soil, sand, or gravel, it will further be understood by those skilled in the art that the terrestrial substrate need not be disposed on the ground; the substrate may be provided on an artificial structure, such as a building roof top or other interior or exterior garden area. Further, the substrate on which the edging and the pavers are provided may not comprise a terrestrial substrate at all, but may comprise another substrate of natural or artificial materials.

Figure 1:
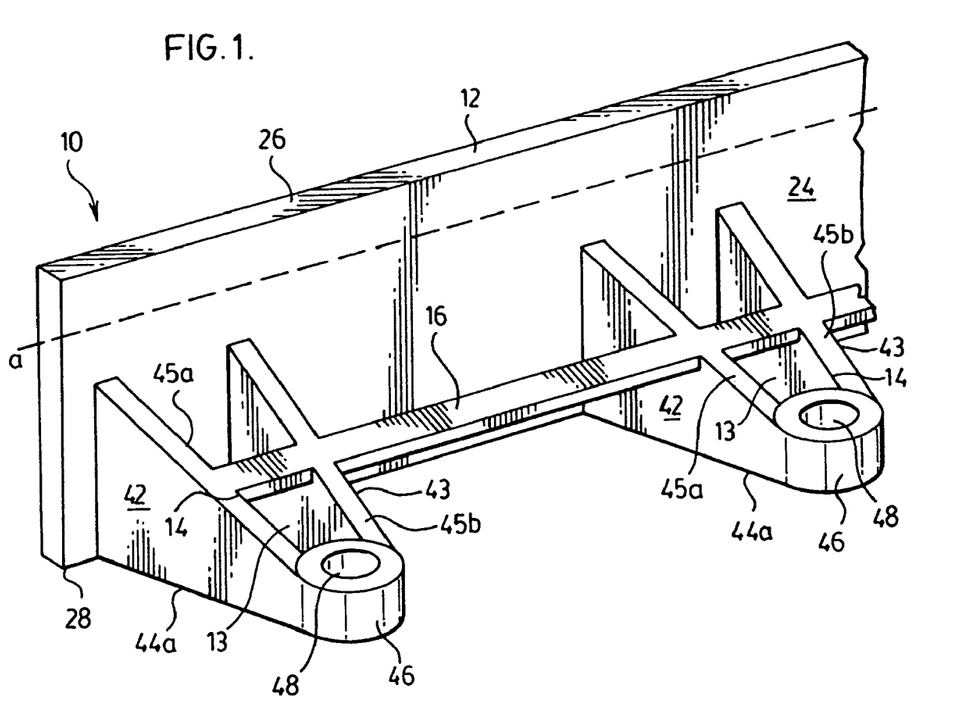
FIG. 1 is a perspective view of an exemplary edging.
Figure 2:
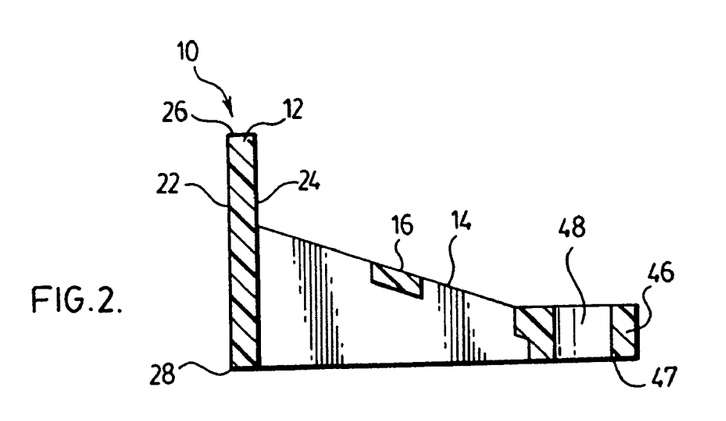
FIG. 2 is a cross-sectional view of the edging of FIG. 1 on a plane perpendicular with an axis a of FIG. 1.
Figure 4A:
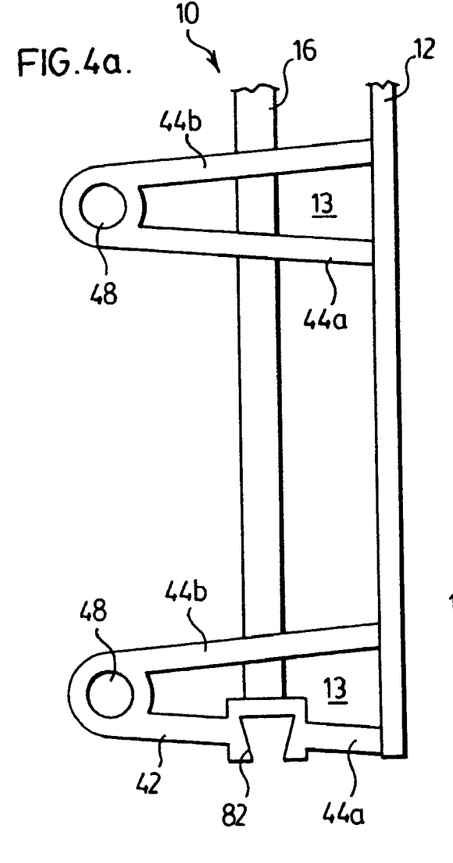
FIG. 4a is a bottom view of a first end of an exemplary edging.
Figure 4B:
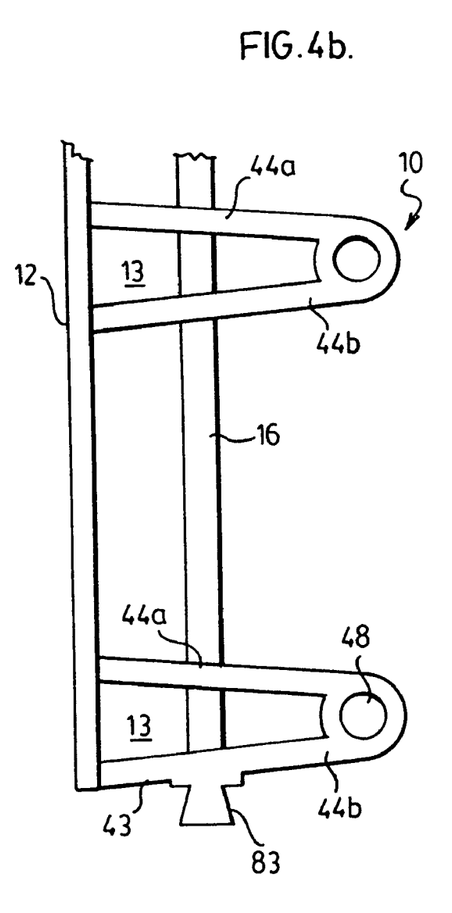

With reference to FIG. 1, a preferred embodiment of the edging 10 is shown. The edging 10 comprises an elongated strip 12 extending in a longitudinal direction. As can be seen in FIG. 2, the elongated strip 12 is provided with a paver-facing surface 22 and an opposed surface 24, as well as a first opposed edge 28 and a second opposed edge 26. Returning to FIG. 1, the edging 10 is further provided with at least two extensions 14. In the preferred embodiment, the extensions 14 comprise a first wall 42 and a second wall 43 extending from the opposed surface 24 of the edging 10. Each of the first wall 42 and the second wall 43 has a first opposed wall edge 44a, 44b respectively (44b is shown in FIGS. 4a and 4b), and a second opposed wall edge 45a, 45b respectively. The first wall 42 and the second wall 43 are joined at or near a distal end 46, in which is provided a bore 48.

Each extension 14 preferably extends substantially perpendicularly from the edging 10. As shown in FIG. 1, the extension 14 may be substantially triangular or wedge-shaped, as defined by the orientation of the first and second walls 42, 43, such that the distance between the first opposed wall edges 44a, 44b and the second opposed wall edges 45a, 45b is greater at the end of the extension 14 proximate the elongated strip 12 than at the distal end 46. The first opposed wall edges 44a, 44b are preferably oriented such that they are substantially perpendicular to the longitudinal axis a of the elongated strip 12. In one embodiment, as shown in FIG. 1, the first opposed wall edges 44a, 44b are substantially planar with the first opposed edge 28 of the elongated strip 10, such that the first opposed wall edges 44a, 44b and the first opposed edge 28 form a substantially flat surface. In other embodiments, however, the first opposed edge 28 need not be coplanar with the first opposed wall edges 44a, 44b.

It will be noted that while, as illustrated in FIG. 1, the second opposed wall edges 45a, 45b are of approximately equal height such that the profile of the first and second walls 42, 43 are substantially similar, the second opposed wall edges 45a, 45b need not be the same, and the first and second walls 42, 43 may have different profiles. In the most preferred embodiment, the first and second walls 42, 43 have substantially the same profile.

The bore 48 is disposed preferably perpendicularly to the first opposed wall edges 44a, 44b, and is sized to receive a spike or stake. The bore 48 may be located at the distal end 46, such that a wall defining the bore 47 defines a point furthest from the elongated wall 12; however, the bore 48 may be disposed closer to the elongated wall 12, such that the first and second walls 42, 43 extend beyond the wall defining the bore 47.

In the preferred embodiment, the first and second walls 42, 43 define a void or open region 13, disposed between the first and second walls 42, 43. In an alternate embodiment, not shown, the void 13 is not provided, and the first and second walls 42, 43 effectively are provided with a single wall having a bore 48 disposed at or near its distal end.

The edging 10 is further provided with a strap member 16 extending between adjacent extensions 14. The cross-sectional profile of the strap member 16 may be a parallelogram, as shown in FIG. 2, or another suitable profile. The strap member 16 is disposed at or near the second wall edges 45a, 45b, such that when the edging 10 is laid on a substantially flat surface on its first opposed wall edges 44a, 44b, the strap member 16 is elevated above the flat surface and a space is defined below the strap member 16. Thus, the strap member 16 is offset from the first opposed wall edges 44a, 44b, and a gap is defined between the strap member 16 and a plane defined by adjacent first opposed wall edges. The strap member 16 is preferably disposed between the elongated strip 12 and the distal end 46, and is generally parallel to the elongated strap 12. The strap member 16 enhances the stability and rigidity of the structure, particularly when the edging 10 is installed against a substantially straight boundary, as described below.

It will be appreciated that the profile of the first and second walls 42, 43 need not be wedge-shaped, but may have another profile instead. The strap member 16 is still disposed at or near the second wall edges 45a, 45b, such that a space below the strap member 16 may be defined when the edging 10 is place of a substantially flat surface, as described above.

Where the edging 10 is provided with more than two extensions 14, a strap member 16 may be provided, connecting each extension 14 with its neighbour; if that is the case, the strap member 16 may comprise, effectively, an elongated strap member extending from a first wall 42 closest to one end of the elongated strap 12, to the last wall 43 closest to the distal end of the elongated strap 12. Alternatively, a plurality of strap members 16 may be provided, wherein each strap member 16 extends from a second wall 43 of a first extension 14 to a first wall 42 of a second extension 14.

Figure 3:
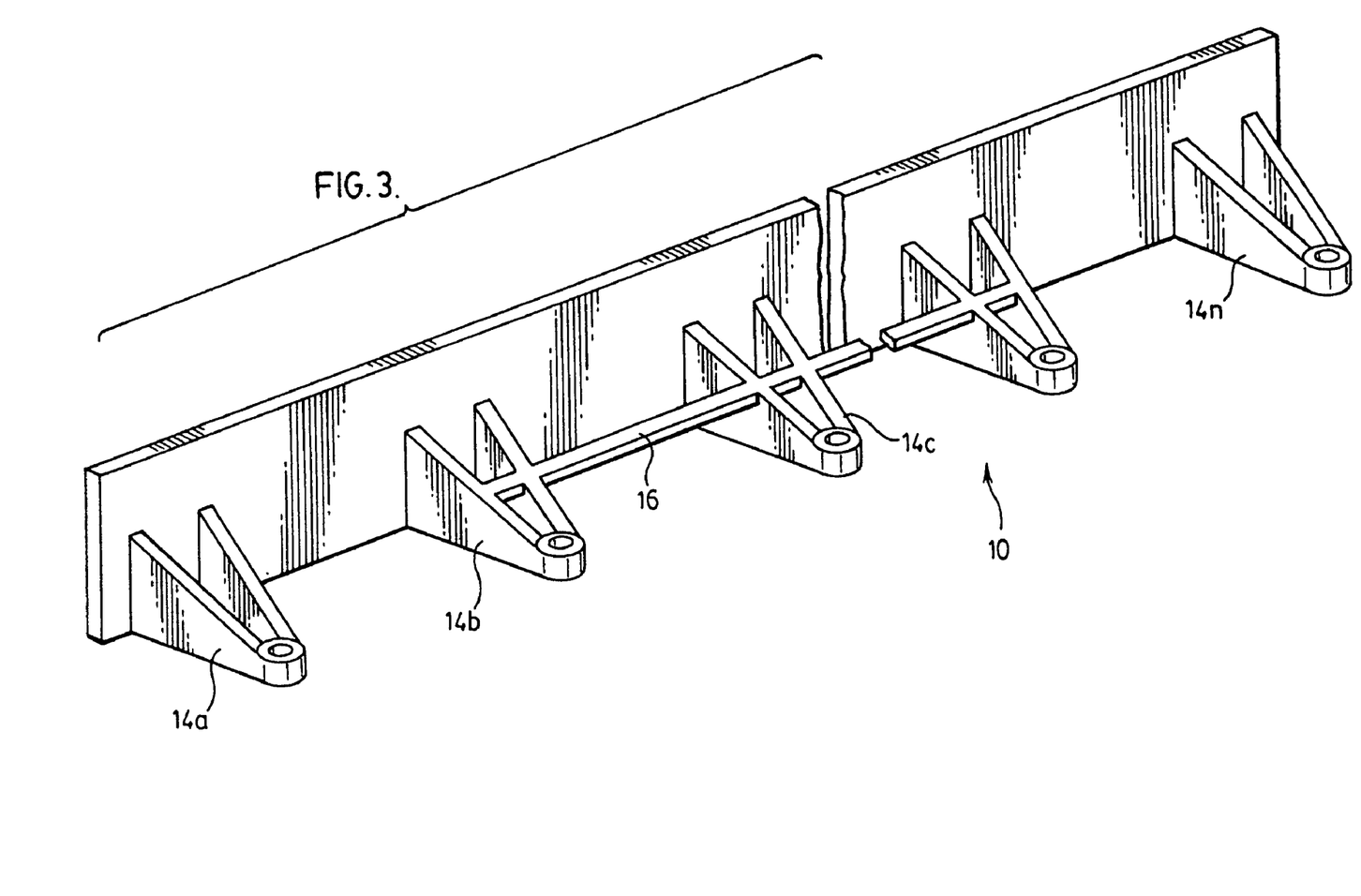
FIG. 3 is a perspective view of a further exemplary edging.

Also, where the edging 10 is provided with more than two extensions 14, the edging 10 may be configured such that only select pairs of extensions 14 are connected by a strap member 16. For example, at least one pair of extensions 14 may be connected, wherein one strap member 16 extends from a second wall 43 of the first extension 14 of the pair to a first wall 42 of the second extension 14 of the pair. The second extension 14 would not be connected to its other neighbouring extension 14, a third extension 14. However, the third extension 14 may be connected to a fourth neighbouring extension 14, or instead the fourth neighbouring extension 14 may be connected to a fifth neighbouring extension 14. Alternatively, at least one pair of extensions 14 may be connected, wherein one strap member 16 extends from a first wall 42 of the first extension 14 of the pair to a first 42 or second wall 43 of the second extension 14 of the pair, but the second extension 14 would not be connected to its other neighbouring extension 14, a third extension 14. However, the third extension 14 may be connected to a fourth neighbouring extension 14 in a similar manner. FIG. 3 depicts an embodiment in which a first extension 14a and a last extension 14n are not connected to a strap member 16, while intermediate extensions 14b and 14c are connected by a strap member 16. This embodiment may include further intermediate extensions also connected by a strap member. Although the first and last extensions 14a, 14n are not provided with a connecting strap member 16, the edging 10 is provided with sufficient stability for application against straight boundaries, while reducing the amount of material (such as polypropylene) required to manufacture the edging 10.

It will be appreciated that in embodiments in which the first and second walls 42, 43 are effectively provided by a single wall, the strap member 16 may be disposed at or near the second wall edge of the single wall, again such that a space below the strap member 16 may be defined when the edging 10 is placed on a substantially flat surface, as described above.

Figure 6:
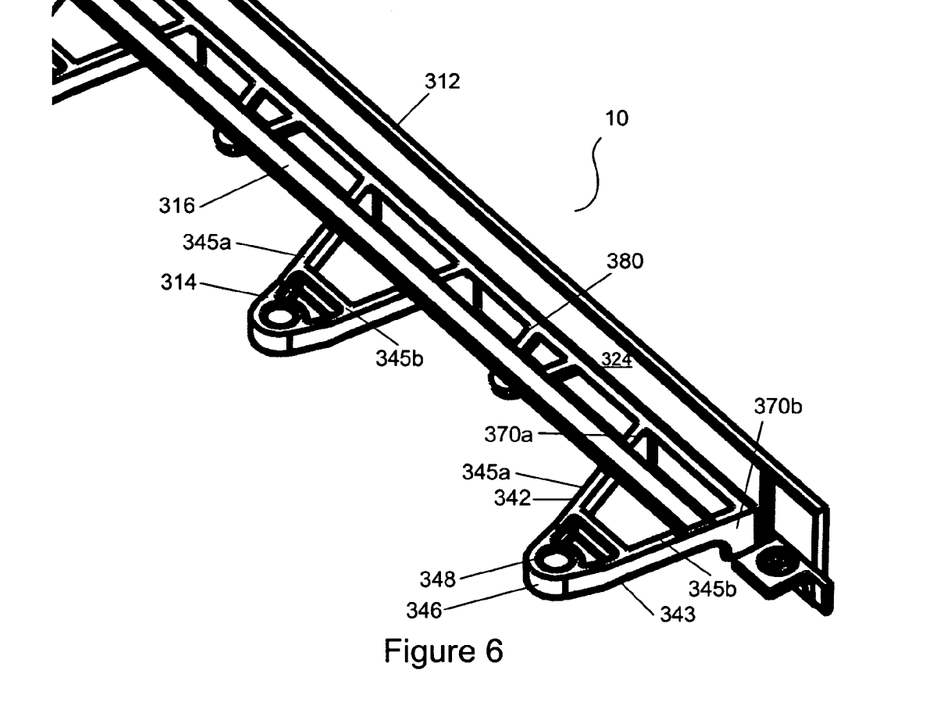
FIG. 6 is a perspective view of a further exemplary edging.
Figure 7:
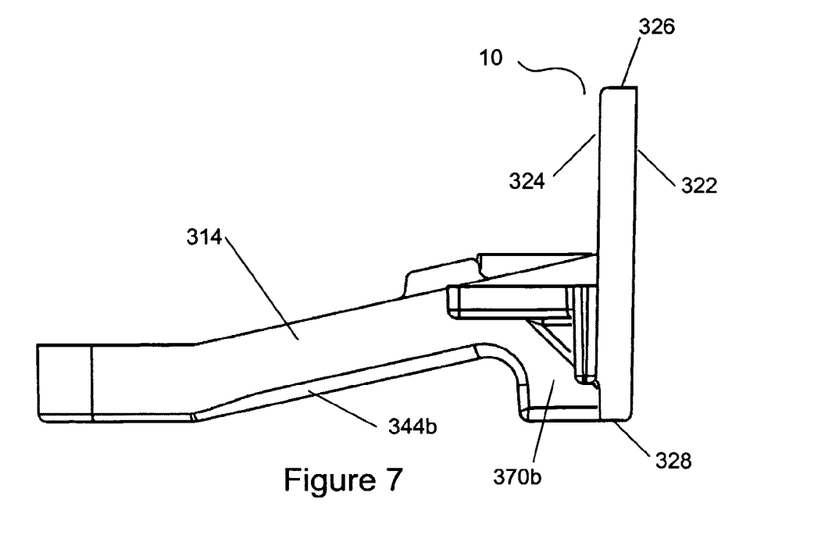
FIG. 7 is a cross-sectional view of the edging of FIG. 6.

In a further embodiment of the edging 10, with reference to FIGS. 6 and 7, the edging 10 comprises an elongated strip 312 extending in a longitudinal direction, again provided with a paver-facing surface 322 and an opposed surface 324, as well as a first opposed edge 328 and a second opposed edge 326. The edging 10 is further provided with extensions 314. Each extension 314 may comprise a first wall 342 and a second wall 343 extending from the opposed surface 324 of the edging 10, as shown in FIG. 6. Each of the first wall 342 and the second wall 343 has a first opposed wall edge 344a and (not indicated in FIGS. 6 or 7) 344b respectively, and a second opposed wall edge 345a, 345b respectively. The first wall 342 and the second wall 343 are joined at or near a distal end 346, in which is provided a bore 348.

Each extension 314 in this embodiment extends outwardly from the edging 10. While the profile of the extension 314 may be generally wedge-shaped, in the embodiment of FIGS. 6 and 7 the second opposed wall edges 345a, 345b slope towards the distal end 346, while the depth of the first and second walls 342, 343 is substantially constant. Thus, at the distal end 346, the first opposed wall edges 344a, 344b may be generally coplanar with the opposed edge 328, or otherwise substantially perpendicular at the distal end 346 to the longitudinal axis of the elongated strip 312. Between the distal end 346 and the opposed edge 328, the first and second walls 342, 343 define a cutout region, thus reducing the mass of the edging 10. For reinforcement, the first and second walls 342, 343 may terminate at the opposed surface 324 with flanges 370a, 370b.

The edging 10 shown in FIGS. 6 and 7 may be further provided with a strap member 316 extending between adjacent extensions 314, disposed on the extensions 314 in a manner similar to that described with respect to the embodiment of FIG. 1. As with the earlier embodiment, the strap member 316 is disposed at or near the second wall edges 345a, 345b, such that when the edging 10 is laid on a substantially flat surface on its first opposed wall edges 344a, 344b, the strap member 316 is elevated above the flat surface and a space is defined below the strap member 316. Thus, the strap member 316 is offset from the first opposed wall edges 344a, 344b, and a gap is defined between the strap member 316 and a plane defined by adjacent first opposed wall edges. The strap member 316 is preferably disposed between the elongated strip 312 and the distal end 346, and is generally parallel to the elongated strap 312. The strap member 316 enhances the stability and rigidity of the structure, particularly when the edging 10 is installed against a substantially straight boundary.

Further, the strap member 316 may be additionally supported by braces 380, disposed on and extending from the opposed surface 324 as shown in FIG. 6. These braces 380 provide additional support to the structure of the edging 10, and again when the edging 10 is laid on a substantially flat surface on its first opposed wall edges 344a, 344b, the braces 380 are elevated above the flat surface thus defining a space below the braces 380.

Optionally, the ends of an edging 10 may be provided with complementary mating joins, because a plurality of edgings 10 may be used to define a paved region. One example of a mating join, not intended to be restrictive of the embodiments described herein, is a dovetail join. As shown in FIG. 4a, a first end of an edging 10 may be provided with a female portion of a dovetail join 82. The female portion of the join 82 may be formed in a wall 42 or 43 of the extension 14 provided nearest an end of an edging 10. As shown in FIG. 4b, the second end of an edging 10 may be provided with the male portion of the join 83. The male portion 83 may be formed in a wall 43 or 42 of an extension 14 provided nearest an end of the edging 10. Preferably, the male and female portions 83, 82 are formed in each edging 10 provided in a set. Thus, consecutive edgings 10, when installed, may be interlocked to enhance the stability of the edgings 10. It will be appreciated that other types of joins may be employed, such as snap-fit male and female connectors and the like.

The edging 10 described above may be used in conjunction with other edgings of compatible dimensions, and compatible mating joins, if available, which are not provided with the strap member 16.

The edging 10 may be provided in varying dimensions, according to the particular composition of the terrestrial substrate, the overlaying material, and the composition and size of the pavers. Such variations in dimensions will be understood by those of ordinary skilled in the art. As only an example of possible dimensions, the height of the elongated strip 12 (i.e., between the second and first opposed edges 26, 28) may be approximately 1.7 inches, the thickness of the elongated strip (i.e., the distance between the paver-facing surface 22 and the opposed surface 24) may be approximately 0.20 inches, the depth of the edging (i.e., from the paver-facing surface 22 to the end of the distal end 46) may be approximately 3.0 inches, the bore may have a diameter of approximately 0.40 inches, and the strap a width of approximately 0.375 inches. The clearance under the strap member 16, that is to say, the offset between the strap member 16 and the first opposed wall edges 44a, 44b, is preferably sufficient to allow a blade of a cutting tool, such as garden shears, to be inserted below the strap member 16 when the first opposed wall edges 44a, 44b are placed on the ground. A sufficient offset may be approximately 0.5 inches, although the selection of a sufficient offset will be understood by those skilled in the art. The foregoing dimensions are not intended to be limiting to the scope of these embodiments or the invention in any way. Typically, it is preferred that the height of the elongated strip 12 be less than the height of the pavers intended for use with the edging 10, particularly if it is desired that the edging 10 be concealed after installation, as described below. Also, if the opposing edge 28 is not coplanar with the first wall edges 44a, 44b, the elongated strip 12 may be extended such that it protrudes beyond the first wall edges 44a, 44b.

Also, while in the preferred embodiment, the edging 10 is formed of plastic material, preferably injection-molded, such as polypropylene, polyvinyl chloride (PVC), and suitable plastics, the edging 10 may also be provided in metal or other materials that will be known to those of ordinary skill in the art, provided that such materials are preferably flexible enough to allow the elongate strip 12 to be bent around curves and irregular boundaries defining a paved region, and durable enough to withstand installation and forces applied against the paver-facing surface 22 of the edging 10 in use.

The edging 10, or a plurality of edgings 10, may be installed on a terrestrial substrate around a region intended to be paved. Typically, once the edging 10 is installed around the boundary of the region and preferably fixed in place using stakes or spikes driven through the bores 48, the edging 10 itself may be concealed by laying a concealing layer. The concealing layer may comprise soil, sand, gravel, or sod, or a combination of two or more of these materials, and is laid over and around the extensions 14 and the one or more strap member 16 of the edging 10, and optionally over the second opposed edge 26 of the edging 10. This concealing layer is thus placed outside the paved region, or in other words, in the non-paved region. It will be appreciated by those skilled in the art that where the concealing layer comprises grass or other plants, the root system of the plants may engage the strap members 16 of the edging 10, by growing around at least a portion of the strap members 16. Thus, the strap members 16 provide an additional anchoring means, besides the bores 48, for fixing the edging 10 to the terrestrial substrate.

Figure 5:
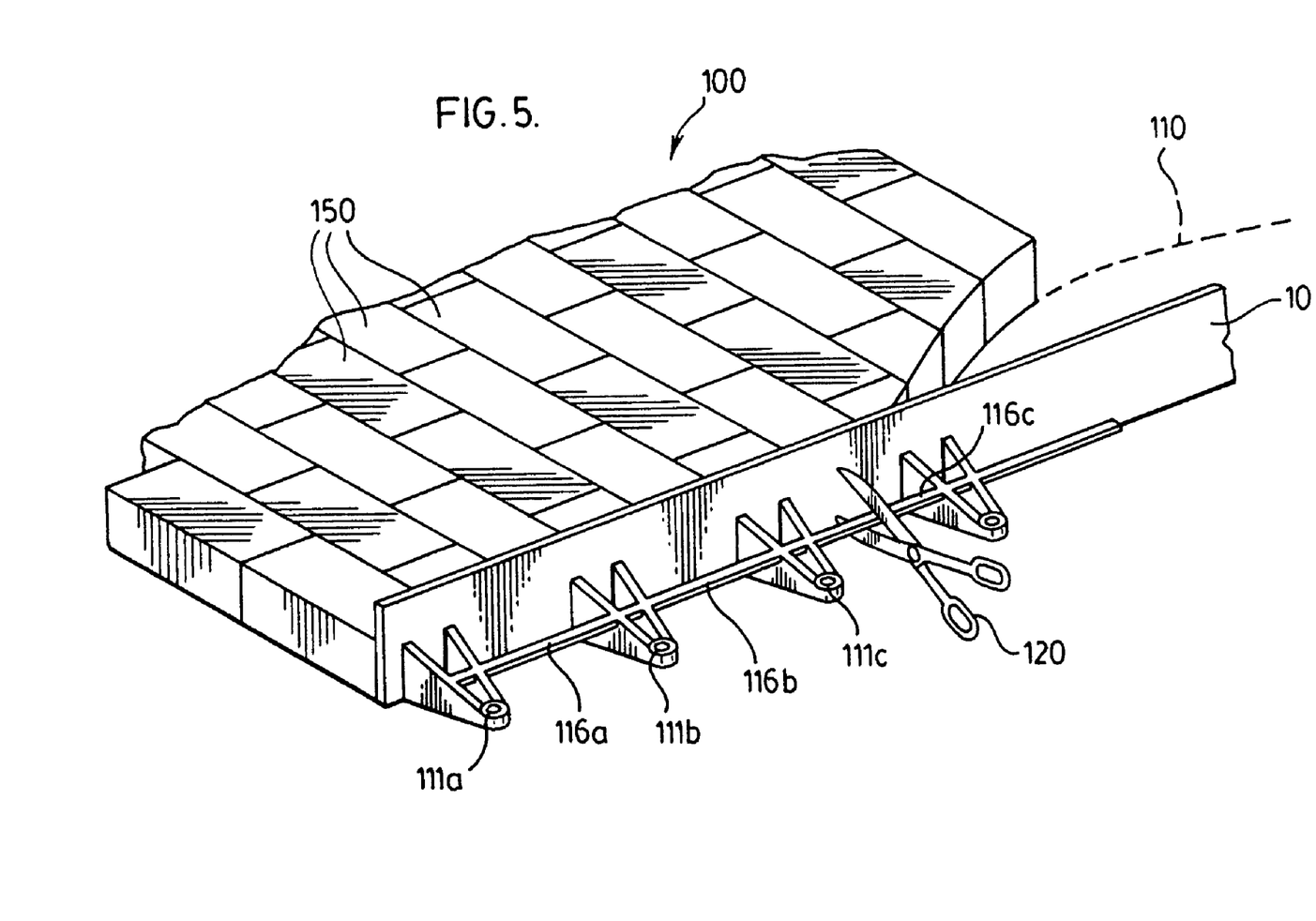
FIG. 5 is a perspective view of an edging of FIG. 1 during installation.

With reference to FIG. 5, once the region to be paved 100 is identified, an edging 10 may be laid against a portion of the boundary 110 defining this region. In the prior art, if the edging 10 did not conform to the desired boundary 110, the edging 10 would have to be removed, shaped, and replaced. However, in accordance with the preferred embodiments described herein, it will be appreciated that the position of the strap member 16 on the edging 10 provides sufficient space for the installer to utilize shears, cutters, saws, knives, or other appropriate cutting tools to cut strap members 16 while the edging 10 is on the substrate.

For example, in a landscaping example shown in FIG. 5, it can be seen that the boundary 110 of the paved region or region to be paved 100 is provided not only with a straight segment, but also a curve. In FIG. 5, the paved region 100 is shown partially paved with pavers 150. A first end of the edging 10 has been fixed in place against the substantially straight portion of the boundary 110 by spikes or stakes 111a, 111b, and 111c, or a similar fastener positioned in the bores (not indicated in FIG. 5), and into the substrate beneath. Strap members 116a and 116b have been left intact, since there is no need to bend the edging 10 at that point. After the straight portion, the boundary 110 curves; at this point, the edging 10 may be left in place and the strap member 116c cut as denoted by cutting tool 120, and then the edging 10 may be bent or deformed to conform to the desired boundary 110. Thus, it can be seen that the position of the strap member 116c, elevated from the terrestrial substrate 101, facilitates the installation of the edging 10. Had the strap member 116c been positioned such that its lower surface were coplanar with the first wall edges 44a, 44b, it could not have been cut by an implement requiring clearance under the strap member 116c without first removing the edging 10 from its place, or alternatively digging under the strap member 116c to provide the required clearance. At the same time, the strap members 116c of the edging 10 will enhance the anchoring of the edging 10, if the concealing layer (not shown) comprises living plants or seeds or root systems that will grow around the cut and uncut strap members 116a, 116b, 116c. Such root systems may extend from above the cut and uncut strap members 116a, 116b, 116c, around said strap members, and into the anchoring region defined below the strap members, that is to say, the gap defined between the strap members and the plane defined by the first wall edges 44a, 44b of the extensions 14.

Thus, it will be appreciated that the preferred embodiments herein provide an improved paver edging that both facilitates installation and provides additional anchoring means that can cooperate with the root systems of plants to reinforce the position of the paver edging once installed. It will also be appreciated that the preferred embodiments described herein also provide a single configuration of improved paver edging that may be used against both curved and straight boundaries; it is not necessary, for example, to provide a separate, reinforced edging for use against straight boundaries or a separate, flexible edging for use against curved boundaries. The single configuration of the edging 10 is provided with reinforcement in the form of the strap member 16, which may be cut to provide for a segment of the edging 10 that is sufficiently flexible to be curved against a curved boundary segment.

It will also be appreciated by those skilled in the art that it may be desirable, prior to paving the region to be paved 100 and installing the edging 10, that a trench be dug in the substrate such that the upper surfaces of the pavers 150 and the second opposed edge 26 of edging 10, once installed, are at or below ground level, that is to say below the upper surface of the concealing layer, once laid. Further, when the edging 10 is installed, multiple edgings 10 may be installed rather than a single length of edging 10, and these multiple edgings 10 when installed may be connected by joins as described above.

Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method for installing pavers in a region to be paved on a substrate, comprising the acts of:
    defining a boundary of the region to be paved on the substrate;
    placing an edging on the substrate along a portion of the boundary, such that a first portion of the edging substantially conforms with the boundary portion and a second portion of the edging does not conform with the boundary portion, and such that the paver-facing surface faces the region to be paved and the first wall edges are in contact with the substrate, the edging comprising:
        an elongated strip extending in a longitudinal direction comprising a paver-facing surface and an opposed surface, and a first and a second opposed edge;
        at least two extensions extending from the opposed surface of the elongated strip, each comprising a first and a second opposed wall edge, and a bore, the first opposed wall edge being coplanar with the first opposed edge, the first opposed edge and the first wall edge defining a base plane; and
        at least one strap member extending between the at least two extensions, wherein the at least one strap member is offset from the base plane;
    fixing the first portion of the edging to the substrate using a fastener positioned in at least one bore of an extension at the first portion of the edging, and in the substrate;
    cutting the strap extending between an extension comprising a bore containing a fastener and a neighbouring extension comprising a bore not containing a fastener using a cutting tool, a portion of the cutting tool being inserted between the substrate and the strap;
    deforming the second portion of the edging to conform with a further boundary portion; and
    fixing the second portion of the edging to the substrate using a fastener positioned in at least one bore of an extension at the second portion of the edging, and in the substrate.

2. The method of claim 1, further comprising the acts of:
    after the first and second portion of the edging are fixed, laying a concealing layer over the edging.

3. The method of claim 2, wherein the concealing layer comprises living plants, root systems, or seeds.

4. The method of 3, further comprising the act of growing a root system such that the at least two strap members are anchored by the root system.

5. The method of claim 1, further comprising the act of, prior to the step of placing an edging on the substrate, digging a trench in the region to be paved and to receive the edging.

6. The method of claim 1, further comprising the act of laying pavers in the region to be paved.

7. The method of claim 1, wherein the extensions each have a free end spaced from the opposed surface of the elongated strip, the at least one strap member being offset or spaced from the free ends of the two extensions.

8. The method of claim 1, wherein the at least one strap member is disposed on or near the second opposed wall edges of the at least two extensions.

9. The method of claim 1, wherein the first opposed wall edge is substantially perpendicular to the elongated strip.

10. The method of claim 1, wherein each extension has a substantially triangular profile.

11. The method of claim 1, wherein each extension comprises a first wall and a second wall, each of the first and second walls each comprising a first and second wall edge, and the bore is disposed between the first and second walls.

12. The method of claim 11, wherein a strap member extends between the second wall of a first extension and the first wall of a second extension.

13. The method of claim 11, wherein the edging further comprises at least four extensions, wherein a first strap member extends between a first extension and a neighbouring second extension, and a second strap member extends between a third extension and a neighbouring fourth extension.

14. The method of claim 1, wherein a first extension nearest a first end of the apparatus is provided with a first mating join, and a second extension nearest a second end of the apparatus is provided with a second, complementary mating join.

15. The method of claim 1, wherein the edging is formed of polypropylene.

* * * * *